United States Patent [19]

Spicuzza

[11] 4,304,797
[45] Dec. 8, 1981

[54] FAST-COOLING STYRENE POLYMER FOAMS

[75] Inventor: John P. Spicuzza, Mt. Lebanon, Pa.

[73] Assignee: ARCO Polymers, Inc., Philadelphia, Pa.

[21] Appl. No.: 235,351

[22] Filed: Feb. 17, 1981

Related U.S. Application Data

[62] Division of Ser. No. 192,664, Oct. 1, 1980, Pat. No. 4,278,730.

[51] Int. Cl.$^3$ ............................................... B05D 1/12
[52] U.S. Cl. .................................. 427/180; 427/222; 521/57; 521/97; 521/146
[58] Field of Search ................ 427/180, 222; 428/407; 521/57, 97, 146

[56] References Cited

U.S. PATENT DOCUMENTS

| | | | |
|---|---|---|---|
| 3,480,570 | 11/1979 | Roberts et al. | 521/57 |
| 3,503,908 | 3/1970 | Ingram et al. | 521/57 |
| 3,789,028 | 1/1974 | Heiskel et al. | 521/57 |
| 3,817,879 | 6/1974 | Walter et al. | 521/57 |

Primary Examiner—Morton Foelak
Attorney, Agent, or Firm—Lewis J. Young

[57] ABSTRACT

Expandable styrene polymer particles which have fast cooling rates during molding are produced by dry blending styrene polymer particles in the presence of 0.06 to 0.60 parts of decaglyceroloctaoleate per 100 parts of polymer particles. The oleate may be added as sole fast cool agent or in addition to the known internal additives which impart fast cool properties.

5 Claims, No Drawings

FAST-COOLING STYRENE POLYMER FOAMS

This is a divisional of application Ser. No. 192,664 filed Oct. 1, 1980 now U.S. Pat. No. 4,278,730.

BACKGROUND OF THE INVENTION

This invention relates to a process for making foamed styrene polymers fast cooling during molding by coating decaglyceroloctaoleate onto the expandable polymer beads by a dry blending process.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article.

The formation of molded articles from expandable styrene polymer particles is effected in two steps: (1) pre-expanding of foamable styrene polymer particles to a density of between 1 and 3 pounds per cubic foot; and (2) further heating the pre-expanded particles in a closed mold to cause further expansion and form a fused, one piece article having the shape of the mold. The second step is what is normally referred to as "molding".

The pre-expansion step may be carried out by heating the expandable polymer pellets by any suitable heating medium such as steam, hot air, hot water, or radiant heat. An excellent method of pre-expansion of the particles is a process such as that disclosed in U.S. Pat. No. 3,023,175 by Rodman. Another excellent method is that disclosed in U.S. Pat. No. 3,577,360 by Immel, which teaches the pre-expansion of polymer beads by heating in a dry atmosphere followed by the application of a vacuum to cause the particles to expand to the desired density.

The molding step normally comprises 4 cycles: (1) the preheating cycle in which the empty mold is preheating with steam; (2) the fill cycle in which the mold is filled with pre-expanded polymer particles; (3) the fusion cycle in which the mold is closed and heated with steam to further expand the particles therein and cause the particles to fuse together; and (4) the cool cycle in which the mold is cooled, usually with recirculating water, or the application of vacuum, to cool the polymer below the softening point of the polymer, the mold is opened and the molded foamed molding is removed from the mold.

After the granules have been heated in the mold to form the desired articles, the article must be cooled for a relatively long period of time, depending upon the thickness of the article, before it can be removed from the mold in a self-supporting state to retain its shape outside the mold. Foamed plastic has good insulation qualities, so the cooling time for the article consumes a large part of the molding cycle and greatly restricts the number of articles that can be produced from a mold in a given period of time.

The cooling time is not appreciably shorted by applying cooling media to the surface of the article or to the mold surface since the heat transfer through the article is extremely slow. This low heat transfer rate is in fact one of the properties which makes these articles useful, for example, for insulation. If the articles are removed from the mold too soon, the combination of the softness of the thermoplastic material and the pressure due to the hot interior of the article will cause the article to bulge and thereafter not have the desired shape.

In U.S. Pat. No. 3,480,570, the addition of a sorbitan fatty acid ester to the surface of expandable styrene polymer particles gave reduced cool time in molding operations.

U.S. Pat. No. 3,503,908 taught the impregnation with polyoxyethylene monoesters of fatty acids, polyoxyethylene sorbitan monoesters of fatty acids, and polyoxyethylene monoethers of fatty alcohols having HLB number of at least 15 to give fast-cool moldings.

U.S. Pat. No. 3,789,028 taught the surface-coating of expandable styrene polymer particles with mono-, di- and triesters of glycerol with fatty acids to aid in shortening the cool time during foaming.

U.S. Pat. No. 3,817,879 taught the surface coating of expandable styrene polymer particles with certain monocarboxamides to give fast cool moldings.

SUMMARY OF THE INVENTION

It has now been found that decaglyceroloctaoleate, when dry blended onto the surface of expandable styrene polymer particles, serves as a fast cool agent for the molding of the particles. Coating with from 0.06 to 0.6 parts of oleate per 100 parts of polymer gives a foamable product which, when molded, requires less time to cool than expandable styrene polymers not having the surfactant present.

DETAILED DESCRIPTION OF THE INVENTION

In accordance with this invention, a variety of expandable thermoplastic homopolymers and copolymers can be rendered fast cooling. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

Especially useful are polystyrene, and copolymers of styrene with 5–30 weight percent of acrylonitrile, maleic anhydride, or methyl acid maleate.

The styrene polymers may be in the form of beads, granules, or other particles convenient for molding operation. Especially useful are the beads formed by the suspension polymerization of the vinyl aryl monomers alone or in combination with the minor amount of copolymerizable monomers.

The styrene polymers, can, of course, be produced by any of the known techniques. The preferred method of preparation is the suspension technique, which gives bead or pellet shaped product.

The expandable styrene polymer particles may be prepared by impregnating the styrene polymer particles with a suitable blowing agent. The blowing agent may be added to the aqueous suspension in which the polymer particles were prepared and prior to the separation of the particles from the aqueous reaction medium.

Alternatively, particles of styrene polymer may be resuspended in an aqueous medium and impregnated with blowing agent. In this case, suspending agents are added to the water to keep the particles from agglomerating at the elevated temperatures used during the impregnation process. Suitable suspending agent systems are, for example, those described in D'Alelio U.S. Pat. No. 2,983,692, such as tricalcium phosphate in combination with an anionic surfactant.

During the impregnation of the particles with blowing agent, other additives can also be incorporated, such as internal fast-cool agents, pigments and dyes, stabilizers, anti-lump agents, self-extinguishing agents, plasticizers and the like.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4–7 carbon atoms in the molecule, such as butane, pentane, hexane, heptane, cyclohexane, and the halogenated hydrocarbons which boil at a temperature below the softening point of the polymer. Mixtures of these agents may also be used, such as a mixture of 40–60% n-pentane and 60–40% trichlorofluoromethane. Usually from 3–20% of blowing agent per 100 parts of polymer is incorporated by the impregnation.

The decaglyceroloctaoleate is added to the polymer particles by dry blending in a suitable mixer. Best results are obtained when amounts of oleate surfactant between 0.06 and 0.6 parts per 100 parts of polymer are added. Less than 0.06 part of surfactant does not give sufficiently low cooling times, greater than 0.6 parts by surfactant serve no useful purpose and increase the cost of the products.

The character and extent of mixing will vary somewhat, usually ranging from about 15 seconds to one hour; typically, 14 seconds to 10 minutes at top speeds from 500 to 2500 inches per second, in order to be of sufficiently high intensity to abrasively mix the surfactant and beads.

Various high intensity mixers may be used. Typically these involve a rotating shaft which carries a transversely extending blade member or members such as an impeller turbine or the like. Preferably the mixing blade or blades are capable of achieving a linear tip velocity as stated of at least about 200 inches per second and preferably about 500 to 2500 inches per second. Exemplary of equipment which is satisfactory is the Papenmeier mixer, obtainable from Welding Engineers, Inc., Norristown, Pa., and the Prodex-Henschel mixer illustrated in U.S. Pat. No. 2,945,634.

Preferably the mixer combines the principle of moving the particles being mixed both locally and in gross. That is to say, it is designed to turn over the material well in order that all the material in the mixer will, in due course, be within the region of high shear supplied by the rapidly moving mixer blades. The mixer of U.S. Pat. No. 2,945,634 provides vortical mixing at high shear rates and, accordingly, accomplishes the objectives of both high shear local mixing and good movement in gross.

The mixer blade or rotor may operate at a variety of angular velocities, but it is important that a substantial peripheral speed be developed. For example, such commercial mixer with a pitched blade and having a radius of about one-third foot, may develop a speed on an order of about 720 inches per second at its blade tips and can accomplish mixing of a batch of beads and surfactant aggregating about 2000 grams in quantity in around 30 seconds. With some surfactants, as little as 15 seconds will suffice, while in other instances a few minutes mixing will be desirable.

In the instant invention the decaglyceroloctaoleate may be dry blended with the styrene polymer particles with ordinary low-intensity mixers as well. A typical low-intensity mixer is a ribbon mixer made by Kelly-Duplex (K/D). Thus, the intensity of mixing is not critical for the invention, as long as intimate coating of the polymer particles is achieved.

The invention is further illustrated by the following examples wherein parts are parts by weight unless otherwise indicated.

EXAMPLE I

To a Henschel mixer, there was charged 100 parts of polystyrene beads having a particle size of predominantly through 16 and on 35 mesh, U.S. Standard Sieve, containing 8 parts of n-pentane blowing agent, and 0.18 parts of decaglyceroloctaoleate (Drewpol 10-8-0, sold by PVO International Corp.). The expandable beads contained 0.2 parts of internal surfactant, polyoxyethylene (16) octylphenol ether, which had been impregnated into the beads with the pentane blowing agent.

The mixture was blended at 610 rpm for 25 seconds and the speed of the mixer was then increased to 1220 rpm for 5 seconds and the mixer allowed to empty while still rotating. The peripheral speeds represented by the rpms were 544 and 1086 inches per second, respectively. A control experiment was run using the above procedure omitting the oleate surface additive.

The beads from the above blending process were pre-expanded to a density of about 2.00 pounds per cubic foot (p.c.f.). The pre-expanded beads were then molded into discs, 8" diameter by 2" thick by placing the beads in a test mold consisting of a porous mold cavity surrounded by a steam chest. Steam at 30 psig was introduced into the steam chest to cause the granules to expand and fuse together. After the steam was shut off, cooling water was circulated through the steam chest. (As used, hereinafter, the term "foam cooling time" is defined at the time it is necessary to circulate the cooling water at 30° C. through the steam chest before the disc is self supporting and will not expand when it is removed from the mold cavity.) Discs molded from these granules were self supporting, had 70% fusion of the beads, and could be removed from the mold after 62 seconds foam cooling time. Discs molded from the control granules had a foam cooling time of 151 seconds. Thus, a reduction of 59% in the foam cooling time was achieved by surface coating the beads with decaglyceroloctaoleate.

EXAMPLE II

To a Kelly-Duplex (K/D) ribbon mixer there was charged 100 parts of expandable polystyrene beads having a particle size of predominantly through 25 and on 45 mesh, U.S. Standard Sieve, containing 8 parts of n-pentane blowing agent, and the amounts of decaglyceroloctaoleate shown in the Table. The expandable beads contained 0.15 parts of internal surfactant, polyoxyethylene (20) sorbitan monolaurate, which had been impregnated into the beads with the pentane blowing agent.

The mixtures were blended in the K/D mixer for times sufficient to assure intimate mixing. The blends were pre-expanded to the densities shown in the Table and aged 48 hours. The pre-expanded beads were then molded into 8" diameter discs as in Example I. Control samples containing no external additive were run at each density to determine cool time of the substrate at each density. Results of cool times are shown in the Table.

TABLE

| Concentration Of Oleate (wt-%) | Density (p.c.f.) | Cool Times (sec.) Sample | Cool Times (sec.) Substrate | Cool Time Reduction vs. Substrate (%) |
|---|---|---|---|---|
| 0.10 | 1.80 | 51 | 84 | 39 |
| 0.20 | 1.83 | 17 | 85 | 80 |
| 0.30 | 1.83 | 17 | 85 | 80 |
| 0.35 | 1.88 | 12 | 100 | 88 |
| 0.50 | 1.70 | 12 | 71 | 83 |

I claim:

1. Method of making foamable styrene polymer particles which yield fast cooling foamed moldings comprising intimately mixing a dry blend of
   (a) styrene polymer particles containing 3 to 20 weight percent of a blowing agent, and
   (b) 0.06 to 0.6 weight percent of decaglyceroloctaoleate.
2. The method of claim 1 wherein said styrene polymer particles are polystyrene.
3. The method of claim 1 wherein said styrene polymer particles are a copolymer of styrene with minor amounts of maleic anhydride.
4. The method of claim 1 wherein said styrene polymer particles are a copolymer of styrene with minor amounts of acrylonitrile.
5. The method of claim 1 wherein said styrene polymer particles are a copolymer of styrene with minor amount of methyl acid maleate.

* * * * *